(12) United States Patent
Lee et al.

(10) Patent No.: US 7,688,706 B2
(45) Date of Patent: *Mar. 30, 2010

(54) METHOD OF TRANSFERRING DATA WITH RESPECT TO AN OPTICAL INFORMATION MEDIUM HAVING A LEAD-IN AREA

(75) Inventors: Kyung-geun Lee, Gyeonggi-do (KR); In-sik Park, Gyeonggi-do (KR); Chong-sam Chung, Gyeonggi-do (KR); Du-seop Yoom, Gyeonggi-do (KR); Ghang-min Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/952,314

(22) Filed: Dec. 7, 2007

(65) Prior Publication Data

US 2008/0089218 A1    Apr. 17, 2008

Related U.S. Application Data

(63) Continuation of application No. 11/242,886, filed on Oct. 5, 2005, now Pat. No. 7,411,891, which is a continuation of application No. 10/633,564, filed on Aug. 5, 2003, now Pat. No. 7,272,106.

(30) Foreign Application Priority Data

Sep. 10, 2002    (KR) .......................... 10-2002-54756

(51) Int. Cl.
*G11B 7/00* (2006.01)
(52) U.S. Cl. .................................. 369/275.4
(58) Field of Classification Search ............... None
See application file for complete search history.

(56) References Cited

U.S. PATENT DOCUMENTS 5,793,741 A     8/1998   Kashihara et al.
6,310,854 B1 *  10/2001  Sato et al. ............... 369/275.3

(Continued)

FOREIGN PATENT DOCUMENTS

CN    1342976    4/2002

(Continued)

OTHER PUBLICATIONS

Office Action issued by Canadian Intellectual Property Office in Canadian Patent Application No. 2,497,659 on Oct. 30, 2006.

(Continued)

*Primary Examiner*—Joseph H Feild
*Assistant Examiner*—Joseph Haley
(74) *Attorney, Agent, or Firm*—NSIP Law

(57) ABSTRACT

A method relative to an optical information storage medium including a lead-in area, a lead-out area, and a user data area between the lead-in and lead-out areas and in which user data is recorded. Pits are formed in the lead-in area, the user data area, and the lead-out area, and a track pitch in all or a portion of the lead-in area is different from a track pitch in the remaining area of the optical information storage medium.

25 Claims, 3 Drawing Sheets

U.S. PATENT DOCUMENTS

| | | | |
|---|---|---|---|
| 6,424,615 B1 * | 7/2002 | Ishimura et al. | 369/275.3 |
| 6,829,211 B2 | 12/2004 | Sako et al. | |
| 7,031,246 B2 | 4/2006 | Sako et al. | |
| 7,272,106 B2 | 9/2007 | Lee et al. | |
| 2002/0027869 A1 | 3/2002 | Morita et al. | |
| 2003/0002429 A1 | 1/2003 | Morita | |
| 2003/0147338 A1 | 8/2003 | Yoshikawa et al. | |
| 2004/0047252 A1 | 3/2004 | Miyatake et al. | |
| 2004/0076110 A1 | 4/2004 | Hino et al. | |

FOREIGN PATENT DOCUMENTS

| | | |
|---|---|---|
| EP | 0 740 289 A1 | 10/1996 |
| JP | 05-266491 | 10/1993 |
| JP | 7-226012 | 8/1995 |
| JP | 07-334867 | 12/1995 |
| JP | 10-222874 | 8/1998 |
| JP | 11-162114 | 6/1999 |
| JP | 2001-195836 | 7/2001 |
| JP | 2001-331945 | 11/2001 |
| JP | 2002-158973 | 5/2002 |
| KR | 2000-5588 | 1/2000 |
| WO | WO 99/48091 | 9/1999 |
| WO | WO 00/75921 | 12/2000 |
| WO | WO 01/99103 | 12/2001 |
| WO | WO 02/39434 | 5/2002 |

OTHER PUBLICATIONS

Office Action issued by Chinese Patent Office in Chinese Patent Application No. 03821287.0 on Jan. 6, 2006.

Office Action issued by Taiwanese Patent Office in Taiwanese Patent Application No. 92124429 on Oct. 14, 2005.

Office Action issued by Korean Intellectual Property Office in Korean Patent Application No. 2002-54756 on Nov. 20, 2006.

U.S. Appl. No. 11/952,245, filed Dec. 7, 2007, Kyung-geun Lee et al.
U.S. Appl. No. 11/952,388, filed Dec. 7, 2007, Kyung-geun Lee et al.
U.S. Appl. No. 11/952,374, filed Dec. 7, 2007, Kyung-geun Lee et al.
U.S. Appl. No. 11/952,361, filed Dec. 7, 2007, Kyung-geun Lee et al.
U.S. Appl. No. 11/952,346, filed Dec. 7, 2007, Kyung-geun Lee et al.
U.S. Appl. No. 11/952,342, filed Dec. 7, 2007, Kyung-geun Lee et al.
U.S. Appl. No. 11/952,326, filed Dec. 7, 2007, Kyung-geun Lee et al.
U.S. Appl. No. 11/952,321, filed Dec. 7, 2007, Kyung-geun Lee et al.
U.S. Appl. No. 11/952,305, filed Dec. 7, 2007, Kyung-geun Lee et al.
U.S. Appl. No. 11/952,417, filed Dec. 7, 2007, Kyung-geun Lee et al.
U.S. Appl. No. 11/952,288, filed Dec. 7, 2007, Kyung-geun Lee et al.
U.S. Appl. No. 11/855,449, filed Sep. 14, 2007, Kyung-geun Lee et al.
U.S. Appl. No. 11/832,172, filed Aug. 1, 2007, Kyung-geun Lee et al.
U.S. Appl. No. 11/242,886, filed Oct. 5, 2005, Kyung-geun Lee et al.
U.S. Appl. No. 11/952,332, filed Dec. 7, 2007, Kyung-geun Lee et al.

Office Action issued by Japanese Patent Office in Japanese Patent Application No. 2006-236169 on Jan. 27, 2008.

Office Action issued by Japanese Patent Office in Japanese Patent Application No. 2004-535237 on Jul. 28, 2009.

Office Action issued by Japanese Patent Office in Japanese Patent Application No. 2006-236169 on Jul. 28, 2009.

* cited by examiner

METHOD OF TRANSFERRING DATA WITH RESPECT TO AN OPTICAL INFORMATION MEDIUM HAVING A LEAD-IN AREA

CROSS-REFERENCE TO RELATED APPLICATIONS

This application is a continuation of U.S. patent application Ser. No. 11/242,886, filed Oct. 5, 2005, now U.S. Pat. No. 7,411,891, which is a continuation of U.S. patent application Ser. No. 10/633,564, filed Aug. 5, 2003, which issued as U.S. Pat. No. 7,272,106, which claims the benefit of Korean Patent Application No. 2002-54756, filed on Sep. 10, 2002 in the Korean Intellectual Property Office, the disclosures of which are incorporated herein in their entirety by reference.

BACKGROUND OF THE INVENTION

1. Field of the Invention

The present invention relates to an optical information storage medium, and more particularly, to an optical information storage medium in which a track pitch in all or a portion of a lead-in area is different from a track pitch in remaining areas of the optical information storage medium so that the reliability of reproduction of important optical information storage medium-related information can be improved.

2. Description of the Related Art

Optical discs are generally used as information storage media of optical pickup devices, which record information on and/or reproduce information from the optical discs without contacting the optical discs. Optical discs are classified as either compact discs (CDs) or digital versatile discs (DVDs) according to their information recording capacity. CDs and DVDs further include 650 MB CD-Rs, CD-RWs, 4.7 GB DVD+RWs, DVD-random access memories (DVD-RAMs), DVD-R, DVD-rewritables (DVD-RWs), and so forth. Read-only discs include 650 MB CDs, 4.7 GB DVD-ROMs, and the like. Furthermore, high-density digital versatile discs (HD-DVDs) have been developed which have a recording capacity of 20 GB or more.

Various methods of increasing the recording capacity of optical discs have been studied. One method of increasing the recording capacity is to reduce a size of an optical spot focused on an optical disc. To reduce the size of the optical spot, the wavelength of a laser light source should be shortened or a numerical aperture (NA) of an objective lens should be increased. Further, the track pitch of the optical disc should be reduced. The track pitch refers to a minimum distance measured from a central line of one track to a central line of an adjacent track.

FIG. 1 illustrates the structure of a conventional DVD-ROM 110. The DVD-ROM 110 includes a user data area 105 in which user data is recorded. A lead-in area 100 is formed inside the user data area 105. A lead-out area 110 which is formed outside the user data area 105. Data is recorded as dots in the lead-in area 100, the user data area 105, and the lead-out area 110. Also, the track pitch is 0.74 µm in the lead-in area 100, the user data area 105, and the lead-out area 110.

The track pitch tends to be reduced when increasing the recording capacity. However, since an optical spot focused on a track may reach an adjacent track, the possibility that cross-talk will occur becomes high as the track pitch is reduced. If cross-talk occurs, an abnormal reproduction signal is output. Thus, as the track pitch is reduced, there is an increase in abnormal reproductions of information.

In particular, if information is abnormally reproduced from an area in which is recorded important information in recording and/or reproducing data, this abnormal reproduction may gravely affect a recording and/or reproduction efficiency of a disc. Accordingly, the track pitch is required to be adjusted in accordance with an increase in the recording capacity of a storage medium and the importance of data.

SUMMARY OF THE INVENTION

The present invention provides an optical information storage medium in which a track pitch in an area in which is recorded important optical information storage medium-related information is different from a track pitch in a user data area in which is recorded user data so that the efficiency and reliability of the reproduction of data can be improved.

Additional aspects and/or advantages of the invention will be set forth in part in the description which follows and, in part, will be obvious from the description, or may be learned by practice of the invention.

According to an aspect of the present invention, an optical information storage medium includes a lead-in area, a lead-out area that is formed outside the lead-in area, and a user data area disposed between the lead-in and lead-out areas and in which user data is recorded where pits are formed in first tracks of the lead-in area, second tracks of remaining area including the user data area, and the lead-out area, and a track pitch of between adjacent first tracks in all or a portion of the lead-in area is different from a track pitch between adjacent second and/or third tracks in the remaining areas of the optical information storage medium.

It is preferable, but not required, that the first track pitch is greater than the second track pitch in the remaining area of the optical information storage medium.

According to an aspect of the invention, the lead-in area includes an area in which optical information storage medium-related information is recorded and an area in which copy protection information is recorded.

It is preferable, but not required, that the first track pitch in at least one of the areas of the lead-in area is greater than the second track pitch in the remaining area of the optical information storage medium.

It is preferable, but not required, that a ratio of tracking error signals detected in the area having the first track pitch to tracking error signals detected in the area having the second track pitch is 1.5 or more.

BRIEF DESCRIPTION OF THE DRAWINGS

The above and/or other features and advantages of the present invention will become more apparent and more readily appreciated by describing in detail exemplary embodiments thereof with reference to the accompanying drawings in which.

DETAILED DESCRIPTION OF THE EMBODIMENTS

Figure 1:
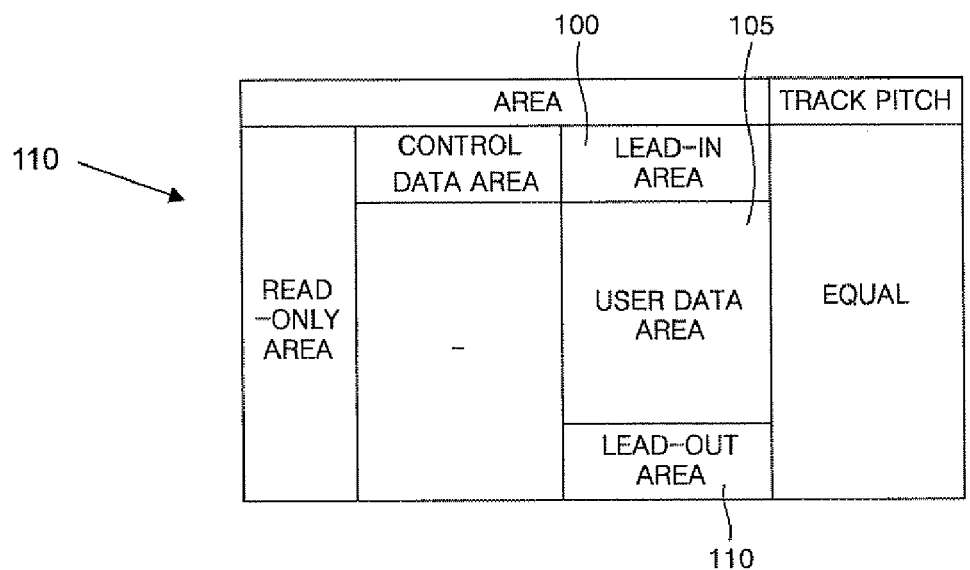
FIG. 1 illustrates the schematic structure of a conventional DVD-ROM.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
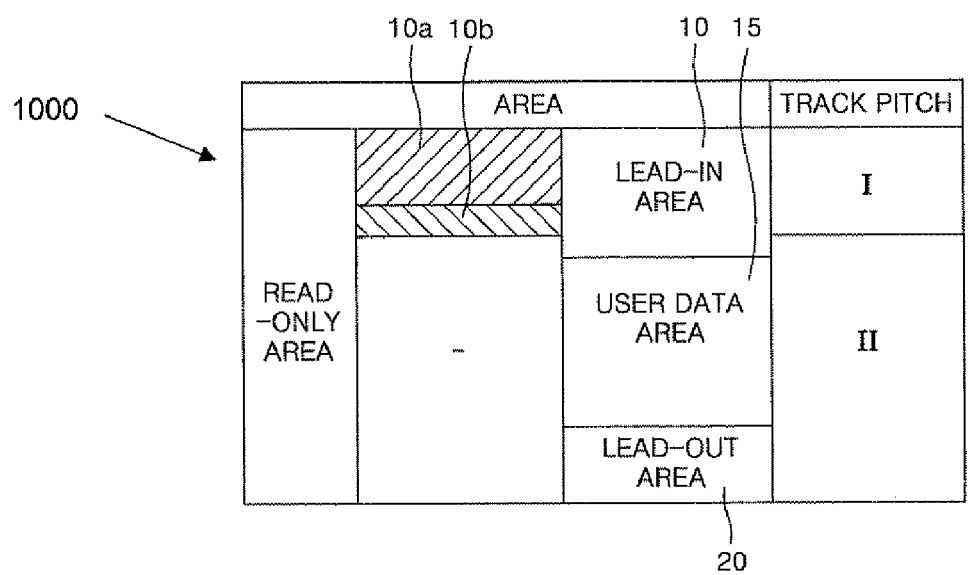
FIG. 2 illustrates the schematic structure of an optical information storage medium according to an embodiment of the present invention.

Referring to FIG. 2, an optical information storage medium 1000 according to an embodiment of the present invention includes a user data area 15, a lead-in area 10 which is formed inside the user data area 15, and a lead-out area 20 which is formed outside the user data area 15 and the lead-in area 10. A first track pitch in all or a portion of the lead-in area 10 is different from a second track pitch in remaining areas of the optical information storage medium 1000 including the user data and lead-out areas 15, 20.

The lead-in area 10 includes areas in which is recorded important data in reproduction from the optical information storage medium. Examples of the important data include optical information storage medium-related information, which is recorded in area 10a, and copy protection information, which is recorded in area 10b. The optical information storage medium-related information contains information on the type of storage medium (such as whether the medium 1000 is a recordable disc, write-once disc, or a read-only disc), information on the number of recording layers, information on the recording speed, and information on the size of the optical information storage medium 1000 (disc).

It is preferable, but not required, that a track pitch in at least one of the areas 10a and 10b is the first track pitch which is greater than the second track pitch in the remaining areas except the areas 10a and 10b. It is understood that additional important information in reproduction from the optical information storage medium 1000 may be recorded, and the track pitch in the entire lead-in area 10 may be the first track pitch which is greater than the second track pitch in the remaining areas of the optical information storage medium 1000.

The optical information storage medium according to an embodiment of the present invention is read-only optical information storage medium. The pits are formed everywhere in the lead-in area 10, the user data area 15, and the lead-out area 20. The pits are formed in a substrate in advance when manufacturing the read-only embodiment of the optical information storage medium 1000. If data is recorded as the pits, the pits can be formed in the lead-in area 10 and the user data area 15 without stopping a process of forming the pits. Thus, a process of manufacturing an optical information storage medium can be simplified and the time required for performing the process can be reduced.

Figure 3A:
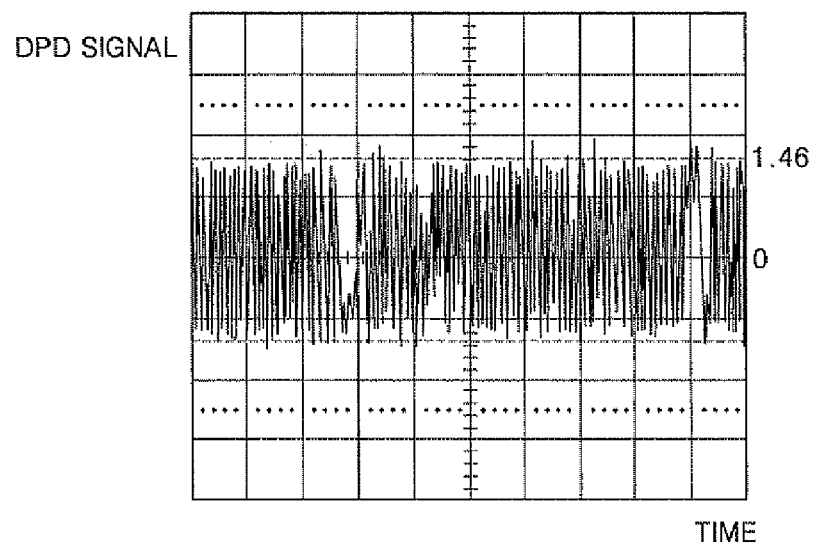
FIG. 3A illustrates a phase tracking error signal (a differential phase detect (DPD) signal) when a track pitch is 0.32 µm.
Figure 3B:
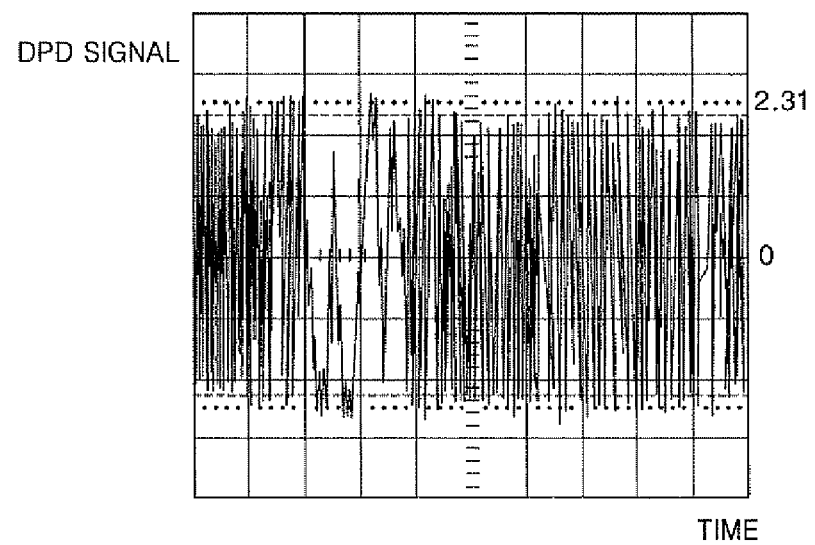
FIG. 3B illustrates a phase tracking error signal (a DPD signal) when a track pitch is 0.35 µm.

One method of performing a tracking operation using the pits is a differential phase detect (DPD) method. For example, the DPD method is used to realize a track servo depending on the phase shift of an optical spot focused on a quarter photodetector. The DPD method is well known, and thus will not be described in detail herein. According to the DPD method, when track pitches on the optical information storage medium are different, an output tracking error signals (such as differential phase tracking error signals) are different. For example, FIG. 3A illustrates a DPD signal when the track pitch is 0.32 μm, and FIG. 3B illustrates a DPD signal when the track pitch is 0.35 μm. Here, when the same reproduction power is output, the amplitude of a phase tracking error signal (a DPD signal) in the track pitch of 0.32 μm was about 1.46V. In contrast, the amplitude of the DPD signal in the track pitch of 0.35 μm was about 2.31V. Thus, the amplitude of the DPD signal when the track pitch is larger increased about 1.58 times the amplitude of the DPD signal when the track pitch is smaller. As can be seen in FIGS. 3A and 3B, as the track pitch increased, the amplitude of the DPD signal is increased. As the amplitude of the DPD signal is increased, an error detecting efficiency is improved. Thus, the reproduction efficiency and reliability are improved as the track pitch increased.

According to the result of simulations, it was found that, when the track pitch TP in the area 10a or the area 10b is I and the track pitch TP in the remaining areas of the optical information storage medium is II, it is preferable, but not required, that a ratio of a tracking error signal, particularly, a phase tracking error signal, to each of the track pitches TP is 1.5 or more as expressed by equation 1 set forth below:

$$\frac{\text{Tracking Error } Signal_{TP=I}}{\text{Tracking Error } Signal_{TP=II}} \geq 1.5 \qquad (1)$$

The optical information storage medium according to embodiments of the present invention can be applied to an optical information storage medium having one or more recording surfaces. In other words, if the optical information storage medium has a plurality of recording surfaces, the track pitch in all or a portion of a lead-in area of each of the plurality of recording surfaces can be greater than the track pitch in the remaining area of each of the plurality of recording surfaces. Accordingly, the track pitch in a portion of the lead-in area in which important information is recorded can be greater than the track pitch in the remaining area of the optical information storage medium so that the reproduction reliability of the important information can be increased.

While not specifically so limited, it is understood that the information storage medium can include the CD-Rs, CD-RWs, DVD-RWs, DVD-RAMs, DVD+RWs, as well as next generation high definition DVDs, such as Blu-ray discs and Advanced Optical Discs (AODs). Further, it is understood the information storage medium need not include lead-in and/or lead-out areas.

Figure 4:
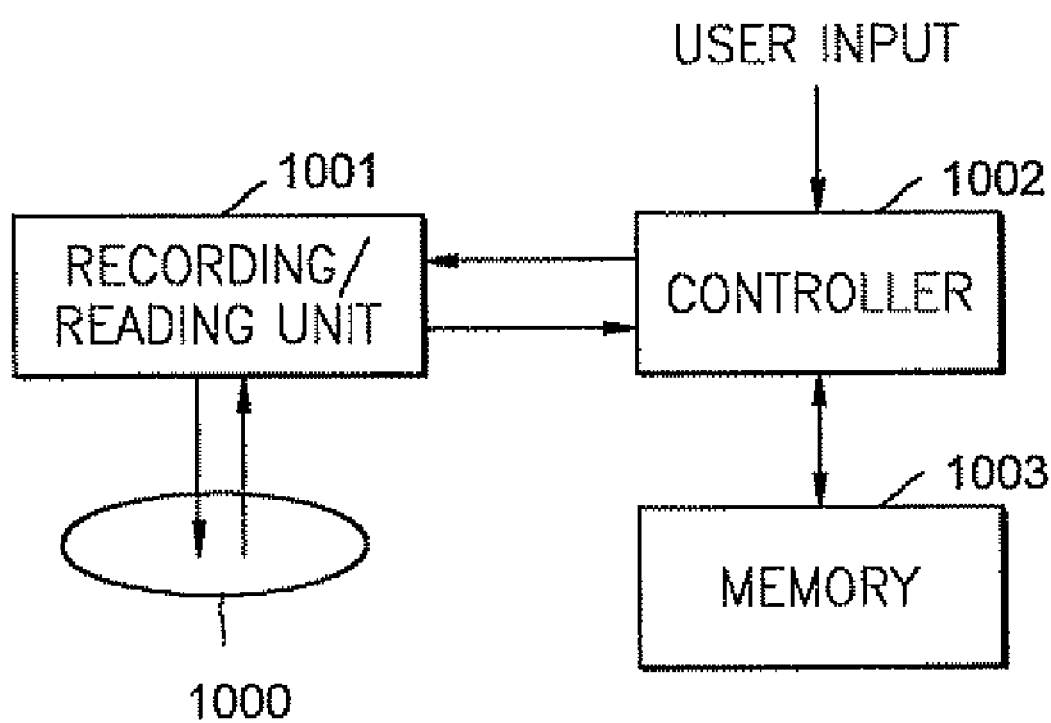
FIG. 4 is a block diagram of a recording and/or reproducing apparatus according to an embodiment of the present invention.

FIG. 4 is a block diagram of a recording and/or reproducing apparatus according to an embodiment of the present invention. Referring to FIG. 4, the recording apparatus includes a recording/reading unit 1001, a controller 1002, and a memory 1003. The recording/reading unit 1001 records data on a disc 1000, which is an embodiment of an information storage medium 1000 of the present invention, and reads the data from the disc 1000. The controller 1002 records and reproduces data from tracks having first and second track pitches according to the present invention as set forth above in relation to FIGS. 2 through 3B.

While not required in all aspects, it is understood that the controller 1002 can be computer implementing the method using a computer program encoded on a computer readable medium. The computer can be implemented as a chip having firmware, or can be a general or special purpose computer programmable to perform the method.

In addition, it is understood that, in order to achieve a recording capacity of several dozen gigabytes, the recording/reading unit 1001 could include a low wavelength, high numerical aperture type unit usable to record dozens of gigabytes of data on the disc 1000. Examples of such units include, but are not limited to, those units using light wavelengths of 405 nm and having numerical apertures of 0.85, those units compatible with Blu-ray discs, and/or those units compatible with Advanced Optical Discs (AOD).

As described above, in an optical information storage medium according to the present invention, the track pitch in an area, such as an optical information storage medium-related information area or a copy protection information area of a lead-in area, in which important information is recorded, is greater than the track pitch in the remaining areas of the optical information storage medium. Thus, reliable reproduction of the important information can be achieved without deteriorating a signal due to cross-talk occurring between adjacent tracks during reproduction of the important information.

While the present invention has been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. A method of transferring data with respect to an optical information storage medium, the medium comprising a lead-in area having a first subarea and a second subarea, a lead-out area, and a data area formed between the lead-in and lead-out areas and in which a predetermined data is recorded, the method comprising:

transferring a first data with respect to the first subarea of the lead-in area having a first track pitch between adjacent tracks; and transferring a second data with respect to at least one of the second subarea of the lead-in area and the data area of the optical information storage medium, the second subarea of the lead-in area, the data area, and the lead-out area each having a second track pitch between adjacent tracks, and the second track pitch being other than the first track pitch, wherein the lead-in area having the first subarea and the second subarea, the data area, and the lead-out area are arranged in sequence, and the data area is not positioned between the first subarea and the second subarea, wherein the first subarea comprises optical information storage medium-related information, and wherein the lead-in area, the lead-out area, and the data area comply with a single disc format.

2. The method of claim 1, wherein the first subarea and the second subarea are contiguous in the lead-in area.

3. The method of claim 1, wherein the optical information storage medium-related information includes a type of optical information storage medium.

4. The method of claim 1, wherein the optical information storage medium-related information includes a number of information recording layers.

5. The method of claim 1, wherein the optical information storage medium-related information includes a size of the optical information storage medium.

6. The method of claim 1, wherein the optical information storage medium-related information includes information regarding reproducing speed or recording speed.

7. An optical information storage medium comprising:
   a lead-in are having a first subarea and a second subarea;
   a lead-out area; and
   a data area formed between the lead-in area and the lead-out area and in which a predetermined data is recorded,
   wherein the first subarea of the lead-in area has a first track pitch between adjacent tracks and the second subarea of the lead-in area, the data area, and the lead-out area have a second track pitch between adjacent tracks,
   wherein the second track pitch is different than the first track pitch,
   wherein the lead-in area having the first subarea and the second subarea, the data area, and the lead-out area are arranged in sequence, and the data area is not positioned between the first subarea and the second subarea,
   wherein the first subarea comprises optical information storage medium-related information, and
   wherein the lead-in area, the lead-out area, and the data area comply with a single disk format.

8. The optical information storage medium of claim 7, wherein the optical information storage medium-related information includes a type of the optical information storage medium.

9. The optical information storage medium of claim 7, wherein the optical information storage medium-related information includes a number of information recording layers.

10. The optical information storage medium of claim 7, wherein the optical information storage medium-related information includes a size of the optical information storage medium.

11. The optical information storage medium of claim 7, wherein the optical information storage medium-related information includes information regarding reproducing speed or recording speed.

12. An apparatus to optically transfer data with respect to an optical information storage medium that comprises a lead-in area having a first subarea and a second subarea, a lead-out area, a data area formed between the lead-in area and the lead-out area and in which user data is recorded, the apparatus comprising:

an optical unit to emit light to transfer data with respect to the optical information storage medium; and a controller to control the optical unit to transfer a first data with respect to the first subarea of the lead-in area having a first track pitch between adjacent tracks and a second data with respect to the second subarea of the lead-in area, the lead-out area, and the data area each having a second track pitch between adjacent tracks, wherein the first track pitch is greater than the second track pitch, wherein the lead-in area having the first subarea and the second subarea, the data area, and the lead-out area are arranged in sequence, and the data area is not positioned between the first subarea and the second subarea, wherein the first subarea comprises optical information storage medium-related information, and wherein the lead-in area, the lead-out area, and the data area comply with a single disk format.

13. The apparatus of claim 12, wherein the optical information storage medium-related information includes a type of the optical information storage medium.

14. The apparatus of claim 12, wherein the optical information storage medium-related information includes a number of information recording layers.

15. The apparatus of claim 12, wherein the optical information storage medium-related information includes a size of the optical information storage medium.

16. The apparatus of claim 12, wherein the optical information storage medium-related information includes information regarding reproducing speed or recording speed.

17. The method of claim 1, wherein the single disk format is CD format of DVD format.

18. The optical information medium of claim 7, wherein the single disk format is CD format or DVD format.

19. The apparatus of claim 12, wherein the single disk format is CD format or DVD format.

20. The method of claim 1, wherein the first track pitch is greater than the second track pitch.

21. The method of claim 1, wherein the first subarea, the second subarea, the data area and the lead-out area are sequentially contiguous in the optical information storage medium.

22. The optical information storage medium of claim 7, wherein the first track pitch is greater than the second track pitch.

23. The optical information storage medium of claim 7, wherein the first subarea, the second subarea, the data area and the lead-out area are sequentially contiguous in the optical information storage medium.

24. The apparatus of claim 12, wherein the first track pitch is greater than the second track pitch.

25. The apparatus of claim 12, wherein the first subarea, the second subarea, the data area and the lead-out area are sequentially contiguous in the optical information storage medium.

* * * * *